(12) United States Patent
Yoon et al.

(10) Patent No.: US 11,971,851 B2
(45) Date of Patent: Apr. 30, 2024

(54) HASH CODE-BASED SEARCH APPARATUS AND SEARCH METHOD

(71) Applicant: KOOKMIN UNIVERSITY INDUSTRY ACADEMY COOPERATION FOUNDATION, Seoul (KR)

(72) Inventors: Myung Keun Yoon, Seoul (KR); Dong Hoon Kim, Seoul (KR); Jun Nyung Hur, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 197 days.

(21) Appl. No.: 17/623,058

(22) PCT Filed: Nov. 11, 2019

(86) PCT No.: PCT/KR2019/015259
§ 371 (c)(1),
(2) Date: Dec. 27, 2021

(87) PCT Pub. No.: WO2021/045312
PCT Pub. Date: Mar. 11, 2021

(65) Prior Publication Data

US 2022/0229810 A1 Jul. 21, 2022

(30) Foreign Application Priority Data

Sep. 3, 2019 (KR) ........................ 10-2019-0109032

(51) Int. Cl.
*G06F 16/00* (2019.01)
*G06F 16/13* (2019.01)
(Continued)

(52) U.S. Cl.
CPC .......... *G06F 16/137* (2019.01); *H04L 9/0643* (2013.01); *H04L 9/3213* (2013.01)

(58) Field of Classification Search
CPC ...... G06F 16/137; G06F 16/313; G06F 16/93; G06F 21/56; G06F 16/325;
(Continued)

(56) References Cited

U.S. PATENT DOCUMENTS 8,151,352 B1 * 4/2012 Novitchi ............... G06F 21/566
717/138
9,686,283 B2 * 6/2017 Hunt .................. H04L 63/1416
(Continued)

FOREIGN PATENT DOCUMENTS

KR        10-0964207 B1    6/2010
KR   10-2013-0078594 A    7/2013

OTHER PUBLICATIONS

International Search Report for PCT/KR2019/015259 dated May 29, 2020 from Korean Intellectual Property Office.

*Primary Examiner* — Noosha Arjomandi
(74) *Attorney, Agent, or Firm* — Paratus Law Group, PLLC (57) ABSTRACT

A hash code-based search apparatus includes a token set extracting unit configured to extract a token set having at least one token from a document, a hash code generating unit configured to generate N hash codes by applying N hash functions to the at least one token (where N is a natural number), and an index generating unit configured to generate a search index by indexing the document with the N hash codes.

11 Claims, 6 Drawing Sheets

(51) Int. Cl.
*H04L 9/06* (2006.01)
*H04L 9/32* (2006.01)

(58) Field of Classification Search
CPC ......... G06F 16/90344; G06F 2207/025; H04L 9/0643; H04L 9/3213
See application file for complete search history.

(56) References Cited

U.S. PATENT DOCUMENTS

| | | | | |
|---|---|---|---|---|
| 9,813,367 | B2* | 11/2017 | Ryan | H04L 51/212 |
| 10,084,779 | B2* | 9/2018 | Hunt | H04L 63/1416 |
| 10,579,661 | B2* | 3/2020 | Drew | G06F 16/35 |
| 11,398,911 | B1* | 7/2022 | Gunning | G06Q 20/363 |
| 2002/0196166 | A1* | 12/2002 | Satoh | H03M 7/3084 |
| | | | | 382/229 |
| 2007/0136243 | A1* | 6/2007 | Schorn | G06F 16/33 |
| | | | | 707/E17.061 |
| 2007/0245118 | A1* | 10/2007 | Suponau | G06F 16/313 |
| | | | | 707/E17.084 |
| 2008/0109651 | A1* | 5/2008 | Duda | H04L 9/3236 |
| | | | | 713/153 |
| 2009/0028441 | A1 | 1/2009 | Milo et al. | |
| 2010/0169329 | A1 | 7/2010 | Frieder et al. | |
| 2014/0082006 | A1* | 3/2014 | Knight | G06F 16/325 |
| | | | | 707/758 |
| 2014/0208421 | A1* | 7/2014 | Rowney | G06F 21/606 |
| | | | | 726/22 |
| 2016/0217135 | A1* | 7/2016 | Wang | G06F 16/3332 |
| 2017/0075887 | A1* | 3/2017 | Drake | G06F 16/5838 |
| 2017/0161375 | A1* | 6/2017 | Stoica | G06F 16/353 |
| 2018/0246985 | A1* | 8/2018 | Sclaroff | G06N 20/00 |
| 2020/0019704 | A1* | 1/2020 | Tora | G06F 21/567 |
| 2021/0021612 | A1* | 1/2021 | Higbee | H04L 63/1491 |
| 2022/0121884 | A1* | 4/2022 | Zadeh | G06V 10/764 |
| 2022/0229810 | A1* | 7/2022 | Yoon | G06F 16/93 |

* cited by examiner

HASH CODE-BASED SEARCH APPARATUS AND SEARCH METHOD

CROSS-REFERENCE TO PRIOR APPLICATIONS

This application is a National Stage Patent Application of PCT International Patent Application No. PCT/KR2019/015259 (filed on Nov. 11, 2019) under 35 U.S.C. § 371, which claims priority to Korean Patent Application No. 10-2019-0109032 (filed on Sep. 3, 2019), which are all hereby incorporated by reference in their entirety.

ACKNOWLEDGEMENT

National R&D Project Supporting the Present Invention
Assignment number: 1711093221
Department name: Ministry of Science and Technology Information and Communication
Research and management institution: Information and Communication Planning and Evaluation Institute
Research project name: Information security core technology development (R&D) Research Project Title: Research on real-time similarity measurement source technology for automatic security big data analysis
Contribution rate: 1/2
Name of project execution institution: Kookmin University Industry Academy Cooperation Foundation
Research period: 2019 Jan. 1~2019 Dec. 31
National R&D Project Supporting the Present Invention
Assignment number: 1711082836
Department name: Ministry of Science and Technology Information and Communication
Research and management institution: Information and Communication Planning and Evaluation Institute
Research project name: Information security core technology development (R&D)
Research Project Title: Behavior-based ransomware detection technology using I/O distribution
Contribution rate: 1/2
Name of project execution institution: Inha University Industry Academy Cooperation Foundation
Research period: 2019 Jan. 1~2019 Dec. 31

BACKGROUND

The present disclosure relates to a hash code-based search technology, and more particularly, to a hash code-based search apparatus and search method capable of reducing a document index storage space and improving a document search speed.

The Internet and computer technologies have been developed and commonly spread all around the world. In addition, with the development of Internet and computer technologies, attempts to make profits by exploiting these technologies are also increasing. For example, there are increasing attempts to install and distribute malware to users' computers to make profits are increasing. Here, malware refers to a program that infiltrates or is installed into a computer without the approval of a computer user and acts against the interests of the computer user. According to statistics of AV-TEST (which is an organization that tests antivirus), an average of 390,000 new malwares and variants are generated per day. In particular, various methods to hide malware itself have been tried, and a pattern of automatic modulation is also seen.

The current technologies for detecting malware are mainly about pattern detection based on signature, and a pattern of malware is manually analyzed by an analyst, and the pattern of malware is extracted and registered in a malware database for comparison.

SUMMARY

The present disclosure provides a hash function-based search apparatus and method capable of reducing an index storage space for a document and improving a document search speed.

The present disclosure also provides a hash function-based search apparatus and method capable of searching for documents based on a user's search term and proving similarities between the documents in order.

The present disclosure also provides a hash function-based search apparatus and method capable of, when a document is received, performing a shingling operation on the document and applying a MinHash function to the document to convert the document into a hash code, and determining a similarity with an existing malware to determine whether the document is malicious.

In one aspect, a hash code-based search apparatus is provided, and the hash code-based search apparatus includes a token set extracting unit configured to extract a token set having at least one token from a document, a hash code generating unit configured to generate N hash codes by applying N hash functions to the at least one token (where N is a natural number), and an index generating unit configured to generate a search index by indexing the document with the N hash codes.

The token set extracting unit may be further configured to generate the at least one token by performing an N-gram-based shingling operation on the document.

The token set extracting unit may be further configured to generate the at least one token by performing an N-gram-based shingling operation on the document and add a numeric value after any duplicated token.

The token set extracting unit may be further configured to generate the at least one token by performing an N-gram-based shingling operation on the document and remove any duplicated token.

The hash code generating unit may be further configured to determine the N hash functions and generate one hash code by applying one of the N hash functions to the at least one token.

The hash code generating unit may be further configured to select the N hash functions from a population of hash functions based on a type of the document.

The hash code generating unit may be further configured to configure each of the N hash functions as a MinHash function so that each of the N hash functions receives the at least one token and a minimum value having a smallest value is determined as the hash code.

The index generating unit may be further configured to configure the N hash codes as an index set of a fixed size, reducing an index storage capacity of the document.

The hash code-based search apparatus may further include a document search unit configured to receive a search term and search for the document based on a similarity between the search term and the search index.

The hash code-based search apparatus may receive the document as a malware and generate the search index as an index for the malware.

In another aspect, a hash code-based search method is provided, and the hash code-based search method includes extracting a token set having at least one token from the document, generating N hash codes by applying each of N hash functions to the at least one token (where N is a natural number), and generating a search index by indexing the document with the N hash codes.

The disclosed technology may have the following effects. However, this does not mean that a specific embodiment should include all of the following effects or only the following effects, so the scope of the disclosed technology should not be construed as being limited thereby.

In the hash function-based search apparatus and search method according to an embodiment of the present disclosure, it is possible to reduce an index storage space and improve document search speed by performing shingling on a document and applying a MinHash function.

In the hash function-based search apparatus and search method according to an embodiment of the present disclosure, it is possible to provide similarities between documents in the same order as the order of Jaccard similarities by applying a MinHash function.

In the hash function-based search apparatus and search method according to an embodiment of the present disclosure, when a document is received, it is possible to perform a shingling operation on the document and apply a MinHash function to the document to convert the document into a hash code, and determine a similarity with an existing malware to determine whether the document is malicious.

BRIEF DESCRIPTION OF THE DRAWINGS

FIGS. 5A and 5B are diagrams in which a general inverted indexing search method and a search method using a MinHash function are compared. FIG. 5B illustrates a search method using a MinHash function.

DETAILED DESCRIPTION

Description of the present invention is made to exemplary embodiments for structural or functional features, and the scope of rights to the present invention will not be construed as being limited to the exemplary embodiments described herein. That is, the exemplary embodiments may be amended in various ways and have various forms. Accordingly, the scope of the present invention will be understood as including equivalents which embody the technical spirit. Furthermore, an objective or effect proposed in the present invention does not mean that a specific embodiment should include all of objectives or effects or should include a corresponding effect, and thus the scope of the present invention should not be understood to be restricted thereby.

Meanwhile, terms used herein will have the following meanings.

Terms "first", "second", etc. are used to distinguish an element from other elements, and the scope of the present disclosure will not be limited by these terms. For example, a first element may be named as a second element, and similarly, the second element may be named as the first element.

It will be understood that when an element is referred to as being "connected" to another element, it can be directly connected or coupled to the other element or an intervening element may be present therebetween. In contrast, when an element is referred to as being "directly connected" to another element, it should bee understood that there is no intervening element. Other words used to describe relationships between elements, such as "between", "directly between", "adjacent", and "directly adjacent", should be interpreted in a like fashion.

An expression of the singular number should be understood to include plural expressions, unless clearly expressed otherwise in the context. It will be further understood that terms such as "comprises" and "have" specify the presence of stated features, items, steps, operations, elements, and/or components, but do not preclude the presence or addition of one or more other features, items, steps, operations, elements, components, and/or groups thereof.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present invention may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium may be distributed to computer systems connected over a network, and the computer-readable code may be stored and executed in the computer systems in a distributed manner.

Unless otherwise defined, all terms used herein and including technical and scientific terms have the same meaning as those generally understood by those skilled in the art. Terms defined in commonly used dictionaries should be interpreted as having the same meanings as those in the context of related technologies, and unless clearly defined, are not interpreted as ideally or excessively formal meanings.

Figure 1:
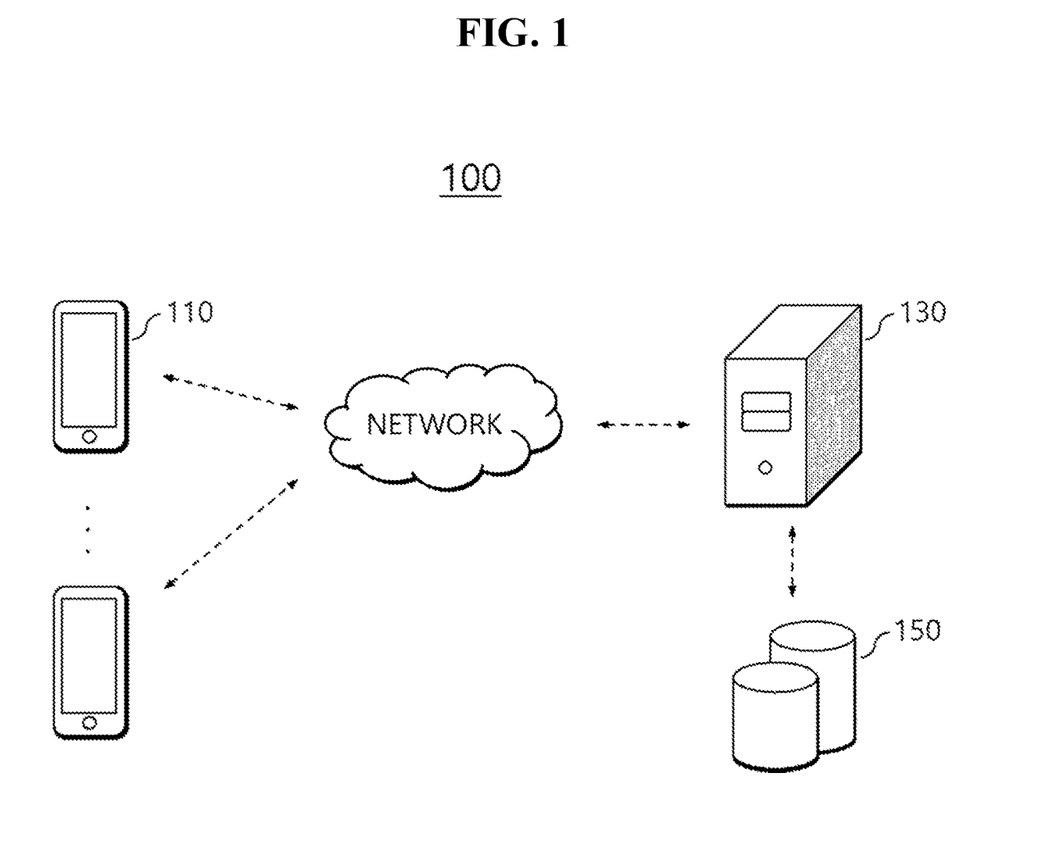
FIG. 1 is a diagram illustrating a hash code-based search system according to an embodiment of the present disclosure.

FIG. 1 is a diagram illustrating a hash code-based search system 100 according to an embodiment of the present disclosure.

Referring to FIG. 1, a hash code-based search system 100 may include a user terminal 110, a hash code-based search apparatus 130, and a hash function population database 150.

The user terminal 110 may be connected to the hash code-based search apparatus 130 through a network and may correspond to a computing device capable of inputting a search term. For example, the user terminal 100 may be implemented as a smartphone, a notebook computer, a tablet PC, or a computer, but not necessarily limited thereto. The user terminal 110 may be connected to the hash code-based search apparatus 130 through a wireless network such as Bluetooth or WiFi or may be connected thereto through a wired network. The user terminal 110 may provide the hash code-based search apparatus 130 a malware in the form of a document or a type of document.

The hash code-based search apparatus 130 may be implemented as a computing server. The hash code-based search apparatus 130 may receive a search term from the user terminal 110, determine a similarity to an existing document, and provide the user terminal 110 with a most similar document or a search result generated based on the most similar document. In one embodiment, the most similar document may be singular or plural. In a case where there is a plurality of the documents, Y number of the documents may be provided in descending order of similarity (where Y is a natural number).

The hash code-based search apparatus 130 may include a processor 210, a memory 230, a user input/output unit 250, and a network input/output unit 270, which will be described in more detail with reference to FIG. 2.

The hash function population database 150 may be operated by an independent device to logically constitute a single database, and may store data of at least N hash functions. The hash function population database 150 may transmit a hash function to the hash code-based search apparatus 130 at the request of the hash code-based search apparatus 130. In one embodiment, the hash function population database 150 may receive a type of document to determine the hash function. In another embodiment, the hash function population database 150 may randomly determine a hash function when there is no particular request.

Figure 2:
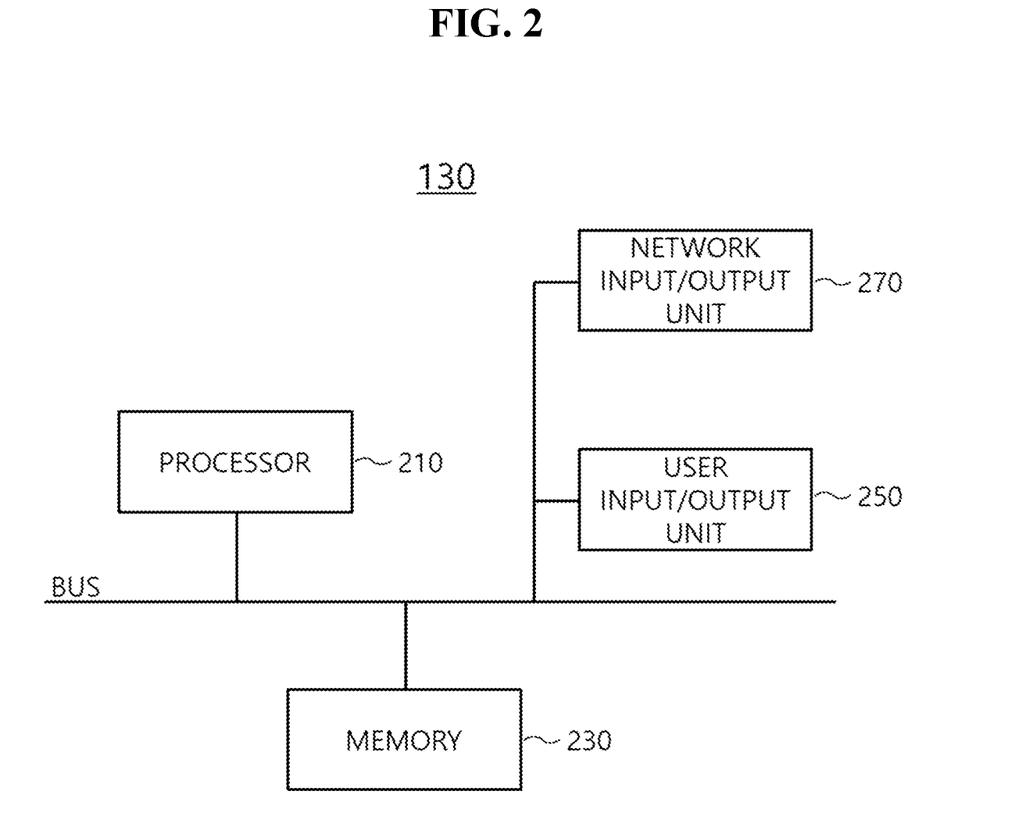
FIG. 2 is a block diagram illustrating a physical configuration of the hash code-based search apparatus shown in FIG. 1.

FIG. 2 is a block diagram illustrating a physical configuration of the hash code-based search apparatus 130 of FIG. 1.

Referring to FIG. 2, the hash code-based search apparatus 130 includes the processor 210, the memory 230, the user input/output unit 250, and the network input/output unit 270.

The processor 210 may execute each procedure for processing operations in the process of generating and providing a hash function in response to a request from a user. The processor 210 may manage the memory 230 that is to be read or written throughout the process. In addition, the process 210 may schedule a synchronization time between a volatile memory and a non-volatile memory in the memory 230. The processor 210 may control the overall operation of the hash code-based search apparatus 130, and may be electrically connected to the memory 230, the user input/output unit 250, and the network input/output unit 270 to control a flow data therebetween. The processor 210 may be implemented as a central processing unit (CPU) of the hash code-based search apparatus 130.

The memory 230 may include an auxiliary storage device implemented as a non-volatile memory such as a solid state disk (SSD) or a hard disk drive (HDD) to store overall data required for the hash code-based search apparatus 130, and may include a main memory implemented as a volatile memory such as a random access memory (RAM).

The user input/output unit 250 may include an environment for receiving a user input and an environment for outputting specific information to the user. For example, the user input/output unit 250 may include an input device including an adapter, such as a touch pad, a touch screen, an on-screen keyboard, and a pointing device, and an output device including an adapter, such as a monitor and a touch screen. In one embodiment, the user input/output unit 250 may correspond to a computing device accessed through remote access. In this case, the hash code-based search apparatus 130 may serve as a server.

The network input/output unit 270 may include an environment for connecting to an external device or a system through a network. For example, the network input/output unit 270 may include an adapter for communication of a Local Area Network (LAN), a Metropolitan Area Network (MAN), a Wide Area Network (WAN), and a Value Added Network (VAN).

Figure 3:
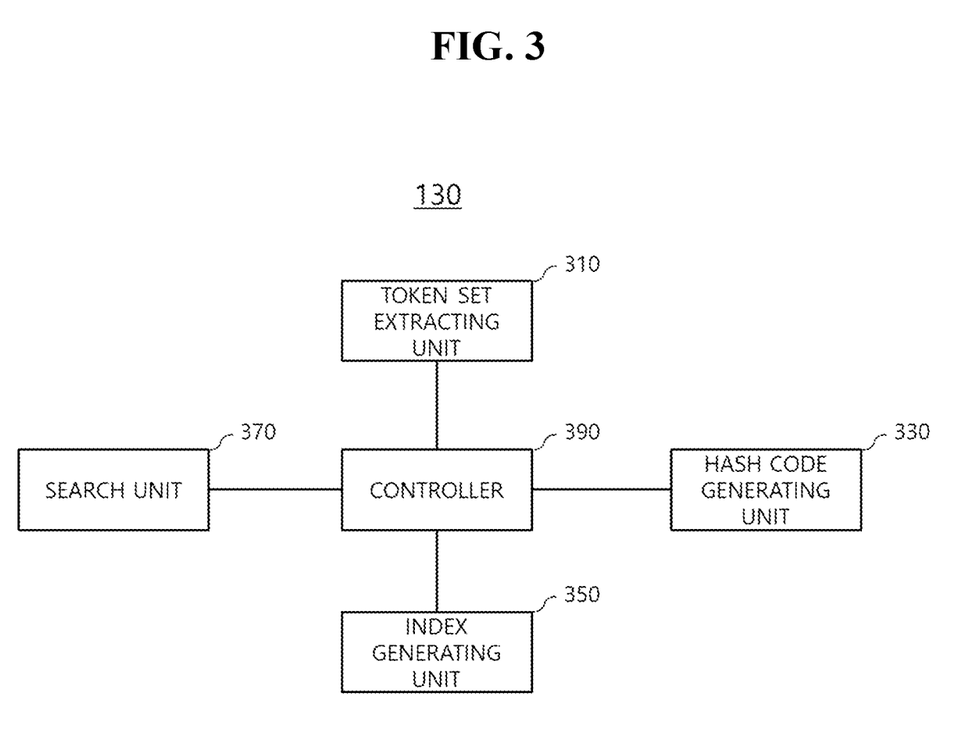
FIG. 3 is a block diagram illustrating a functional configuration of the hash code-based search apparatus shown in FIG. 1.

FIG. 3 is a block diagram illustrating a functional configuration of the hash code-based search apparatus 130 of FIG. 1.

Referring to FIG. 3, the hash code-based search apparatus 130 includes a token set extracting unit 310, a hash code generating unit 330, an index generating unit 350, a search unit 370, and a controller 390.

The token set extracting unit 310 may extract a document as a token set, and the token set includes at least one token. In this case, the document may correspond to a text file or a binary file. A token is the smallest unit of classification of a given document. For example, the token may correspond to a word in a text document and may correspond to a binary string in a binary document. In one embodiment, the token may correspond to a document fragment separated by a separator predefined by a user. For example, the separator may correspond to a user-defined character or special character such as space, comma, colon, and semicolon.

In one embodiment, the token set extracting unit 310 may generate at least one token by performing an N-gram-based shingling operation. N-gram, which is to divide a long-length document, may be used to decompose the document into tokens and may control the size of token in the document. More specifically, N-gram may be classified into 1-gram, Bi-gram, and Tri-gram schemes based on the size of token. For example, when a document includes (rose is a rose), the token set extracting unit 310 may obtain a token set of {(rose), (is), (a), (rose)} through the 1-gram scheme and obtain a token set of {(roese, is), (is, a), (a, rose)} by the Bi-gram scheme.

In one embodiment, the token set extracting unit 310 may generate at least one token by performing an N-gram-based shingling operation, and in a case where tokens are duplicated, a value indicating the number of duplication may be added after the corresponding duplicated tokens. For example, when the token set extracting unit 310 includes a document (a rose is a rose is a rose) and a shingle of size 4 is applied, a token set of {(a,rose,is,a,1), (rose,is,a,rose,1), (is,a,rose,is,1), (a,rose,is,a,2), (rose,is,a,rose,2)} may be obtained.

In one embodiment, the token set extracting unit 310 may generate at least one token by performing an N-gram-based shingling operation and remove any duplicated token. For example, when the token set extracting unit 310 includes a document (a rose is a rose is a rose) and a shingle of size 4 is applied, a token set of {(a,rose,is,a), (rose,is,a,rose), (is,a,rose,is)} may be obtained.

Figure 5A:
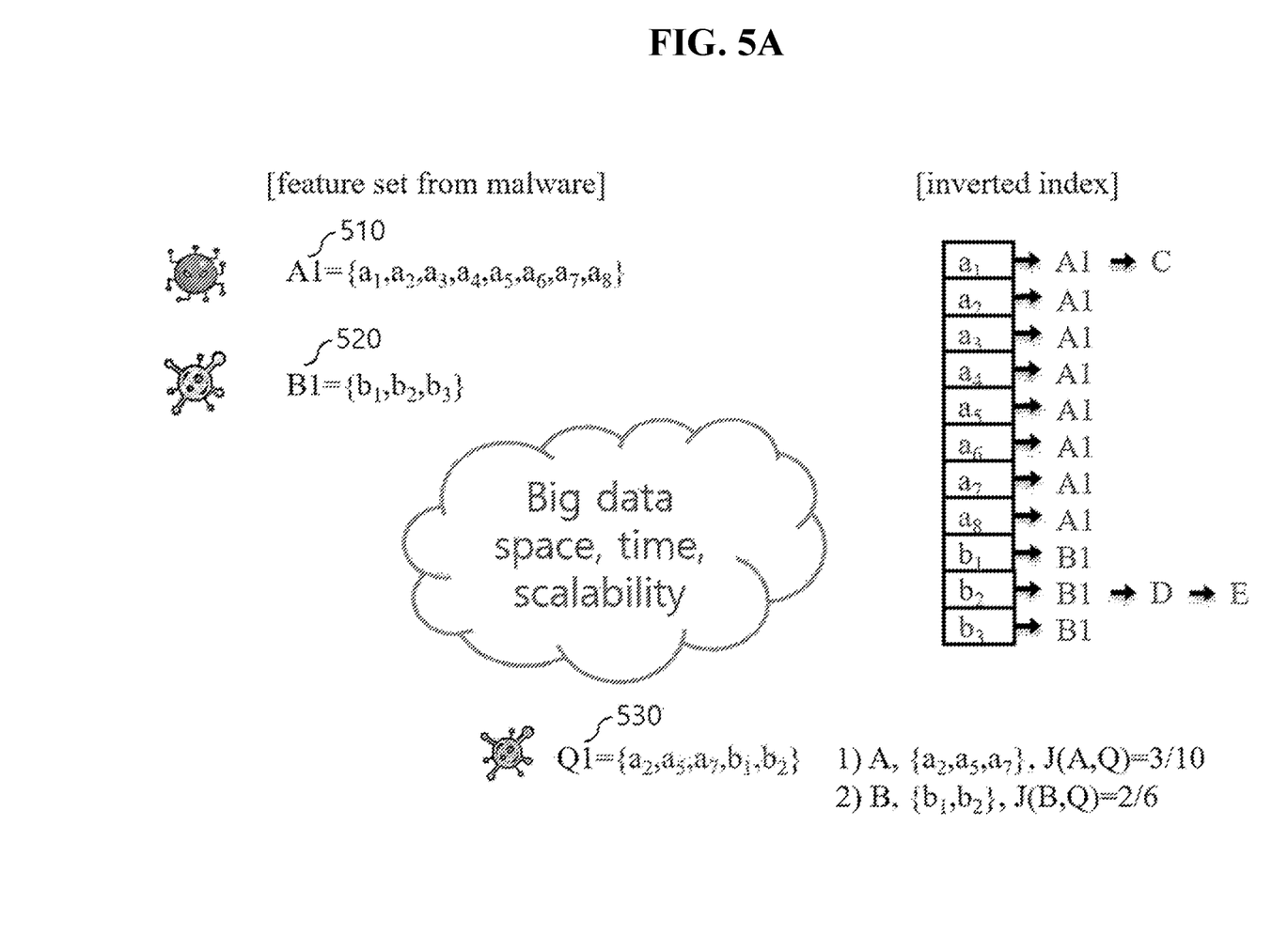
FIG. 5A illustrates a general inverse index search method.
Figure 5B:
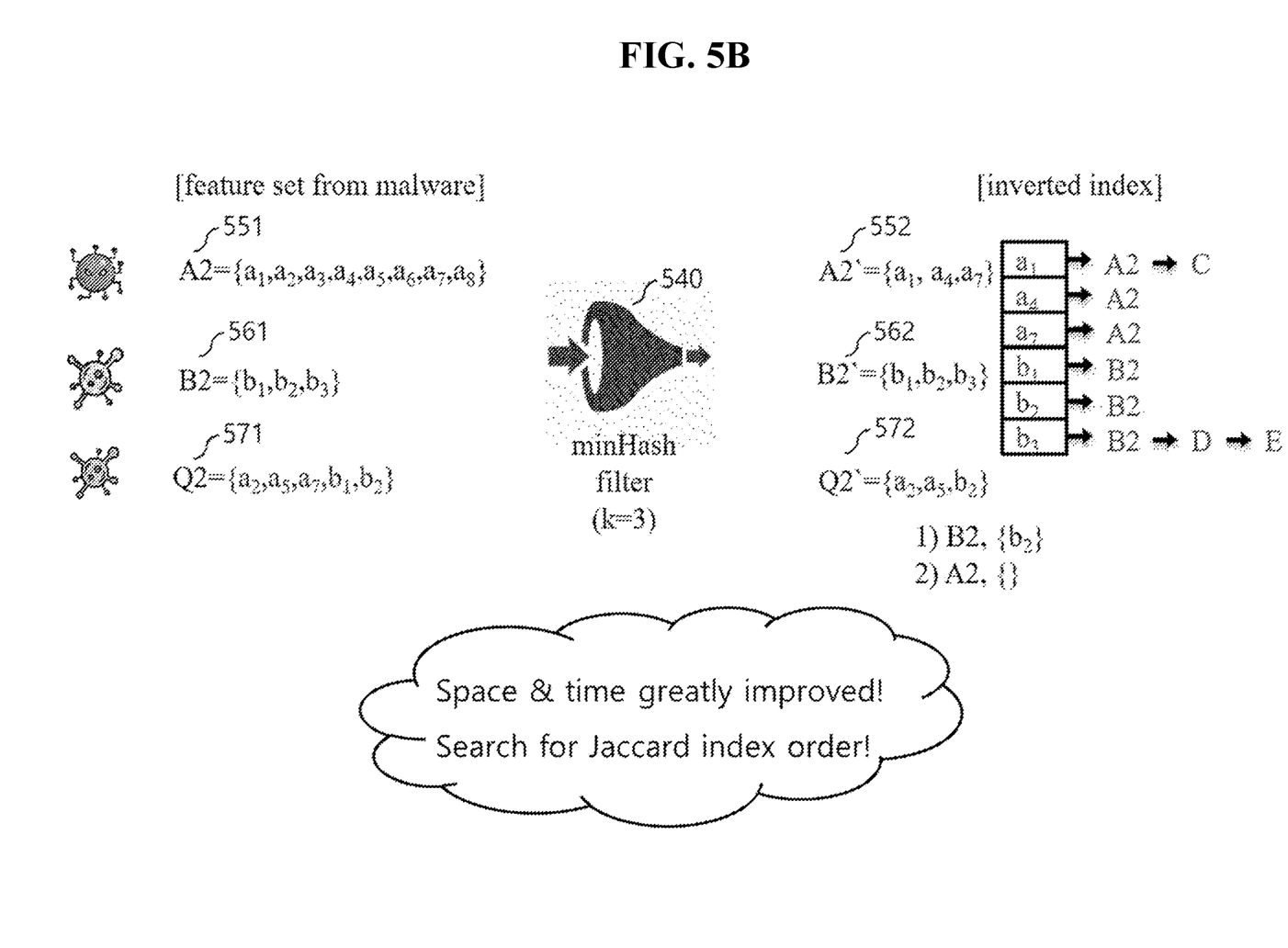

The hash code generating unit 330 may generate N hash codes by applying each of N hash functions to at least one token (where N is a natural number). When the document is decomposed into a token set, the hash code generating unit 330 may apply a hash function to the token set and determine a hash code. By repeating such a process for application and determination N times, the hash code generating unit 330 may obtain the N hash codes by using the N hash functions. The hash code generating unit 330 may apply a hash function to a token set consisting of tokens having a variable number and generate a hash code of a fixed length. For example, a hash code may be calculated based on a hash value. The hash code generating unit 330 may employ a MinHash function as a hash function and may consume relatively less system resources such as the CPU and the memory by using the MinHash function, thereby improving a search speed. The MinHash function will be described later with reference to FIG. 5.

The hash code generating unit 330 may determine N hash functions. In one embodiment, the hash code generating unit 330 may determine a hash function based on a fixed size of the hash code. For example, the hash code generating unit 330 may determine that a hash function has an output of 32 bits, 64 bits, 128 bits, 160 bits, 192 bits, 224 bits, 256 bits, 512 bits, 1024 bits, or 2056 bits. In another embodiment, the hash code generating unit 330 may select N hash functions from a hash function population based on a type of document. For example, when the document corresponds to a text file, the hash code generating unit 330 may select a hash function that outputs a hash code having a relatively large fixed size. In another example, when the document corresponds to a binary file, the hash code generating unit 330 may select a hash function that outputs a hash code having a relatively small fixed size.

In one embodiment, the hash code generating unit 330 configures each of the N hash functions as a MinHash function so that that each hash function receives at least one token and a minimum value having a smallest value is determined as a hash code. The hash code generating unit 330 may generate a matrix composed of shingles to configure a MinHash function, and each row of the matrix may be regarded as one document. Next, the hash code generating unit 330 may generate a plurality of permutations, which are shuffled column indices of the matrix, and check the permutations for the respective columns in order from 1 to n, and when the permutation number is 1, the hash code generating unit 330 fills a signature matrix with the corresponding permutation number.

In another embodiment, the hash code generating unit 330 may configure M hash functions out of N hash functions as MinHash functions (where M is a natural number less than N) and configure (N−M) hash functions as MaxHash functions, and each of the MinHash and the MaxHash functions receives at least one token to determine the minimum or maximum value as a hash code.

The index generating unit 350 may configure the N hash codes as an index set of a fixed size, reducing the index storage capacity of the document. Elastic search has a disadvantage in that the storage capacity increases because indexing is immediately performed after shingling of documents. The index generating unit 350 may index the hash code of a fixed size, saving a storage capacity. In one embodiment, when indexing is performed after shingling of a document and applying a MinHash function, the hash code-based search apparatus 130 may shingle a search term and detect a similarity between the hash code to which the MinHash function is applied and an indexing file for the document, and the hash code-based search apparatus 130 may delete a pre-stored document and the indexing file, saving a storage capacity.

The search unit 370 may receive a search term and search for a document based on a similarity between the search term and a search index. In one embodiment, in the case of a general document, the search unit 370 compares an index value of a document generated by the token set extracting unit 310, the hash code generating unit 330, and the index generating unit 350 with a hash code value of a search term.

In another embodiment, in the case of a malware document, the search unit 370 compares an index value of a malware document generated by the token set extracting unit 310, the hash code generating unit 330, and the index generating unit 350 with a hash code value of the input document. In one embodiment, the search unit 370 may use Jaccard similarity in the process of checking the similarity. A Jaccard index between two shingled sets A and B is calculated as follows [Equation 1].

$$J(A, B) = \frac{|A \cap B|}{|A \cup B|} = \frac{|A \cap B|}{|A| + |B| - |A \cap B|} \quad \text{[Equation 1]}$$

For example, for a similarity between a search term and an indexed document, the search unit 370 may use the Jaccard similarity to calculate a similarity whose maximum value is 1. The Jaccard index has a value of 1 when two token sets are the same, and a value of 0 when there is no common element in the two token sets.

In one embodiment, when the shingling set of the document is not deleted, the search unit 370 compares the shingling set of the search term with the shingling set of the document and detects the Jaccard similarity to determine the similarity between the document and the search term.

In one embodiment, when the shingling set of documents is deleted, the search unit 370 detects the Jaccard similarity using a fixed number of hash values indexed in the document and a fixed number of hash values of a search term to detect the document and the similarity between the search terms can be determined. For example, assuming that a set derived by applying shingling to Document 1 is X, a set derived by applying shingling to Document 2 is Y, and sets respectively derived by applying a MinHash function of size k to the sets X and Y are X' and Y', this may be expressed as [Equation 2] as follows.

$$J(X, Y) \approx \frac{|X' \cap Y'|}{k} \quad \text{[Equation 2]}$$

A Jaccard similarity between a fixed number of hash values indexed in a document and a fixed number of hash values of a search term is similar to a Jaccard similarity between a shingling set of the document and a shingling set of the search term. This will be described in detail in FIG. 5.

Figure 4:
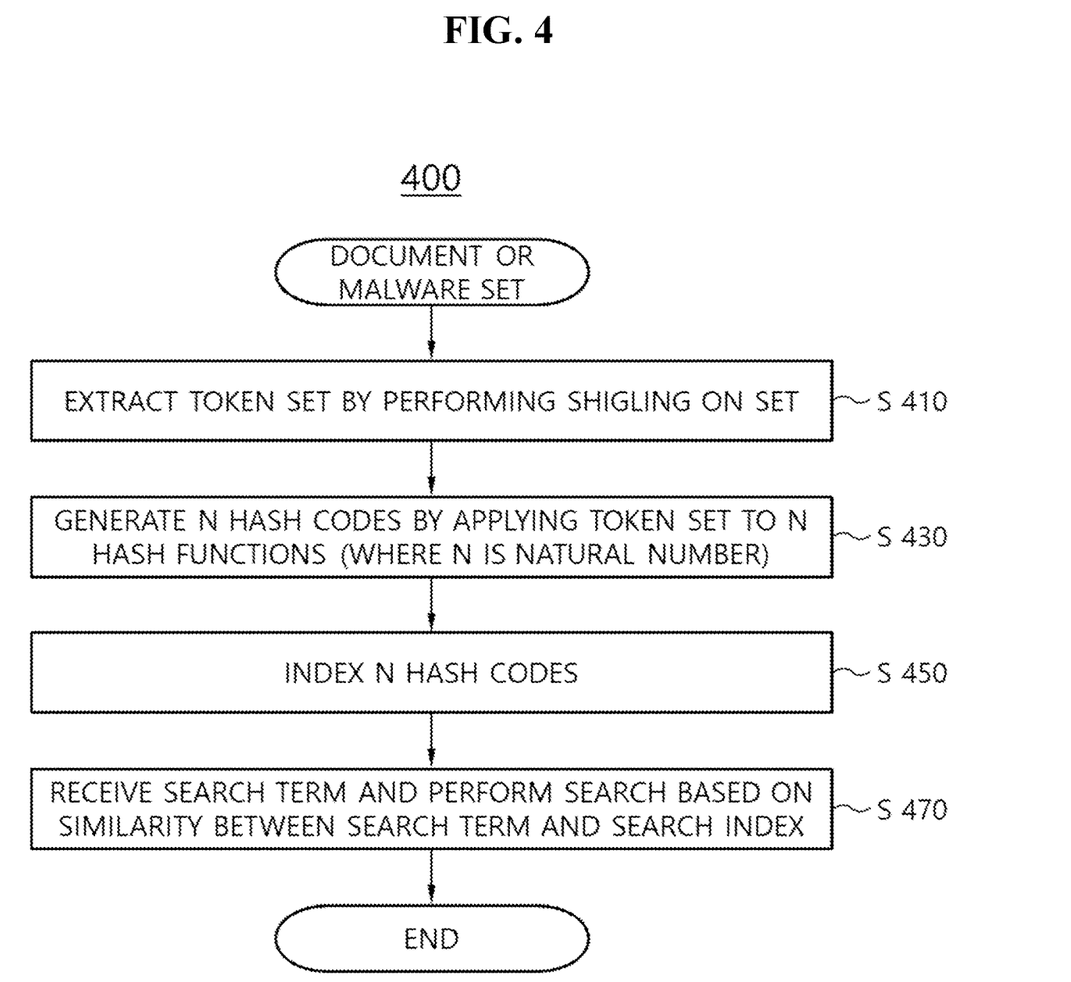
FIG. 4 is a flowchart illustrating a search process performed by the hash code-based search apparatus of FIG. 1.

FIG. 4 is a flowchart illustrating a search process performed by the hash code-based search apparatus 130 of FIG. 1.

In FIG. 4, a search process 400 performed by the hash code-based search apparatus 130 includes operations 5410 to 5470.

The hash code-based search apparatus 130 may extract a token set by performing a shingling operation on a document through the token set extracting unit 310 in operation 5410.

Operation 5410 of extracting the token set is a process of creating a target to which a hash function is applied. In one embodiment, a token may be generated by performing an N-gram-based shingling operation on a document or a malware set.

The hash code-based search apparatus 130 may generate N hash codes by applying a token set to N hash functions through the hash code generating unit 330 in operation 5430. Operation 5430 of generating the hash code is an operation of generating N hash codes by applying the N hash functions to the token extracted in operation 5410 of extracting the token set. That is, operation 5430 is a preprocessing for indexing.

The hash code-based search apparatus 130 may index the N hash codes through the index generating unit 350 in operation 5450. The operation 5450 of indexing the N hash codes is a process of reducing a storage space by indexing the hash codes of a fixed size.

The hash code-based search apparatus 130 may receive a search term through the search unit 370 and perform a search based on a similarity between the search term and the document in operation 5470. In operation 5470 of performing a search based on the similarity between the search term and the document, the Jaccard similarity may be used to check the similarity.

FIGS. 5A and 5B are diagrams in which a general inverted indexing search method and a search method using a MinHash function are compared.

FIG. 5A illustrates a general inverse index search method, and FIG. 5B illustrates a search method using a MinHash function.

In FIG. 5A, a general inverse index search method may be used to determine a similarity of elements between an arbitrary set Q1 530 and a set A1 510 or a set B1 520. In regard to the similarity between the set Q1 530 and the set A1 510 or the set B1 520, the similarity between the set Q1 530 and the set A1 510 is higher than the similarity between the set Q1 530 and the set B1 520 since the set Q1 530 and the set A1 510 have three elements in common. However, a Jaccard Index value between the set Q1 530 and the set A1 510 and a Jaccard Index value between the set Q1 530 and the set B1 520 are J(A1,Q1)=3/10 and J(B1,Q1)=2/6, respectively, and the Jaccard index value between the set B1 520 and the set Q1 530 is higher. The general inverse index search method has problems that the number of similar elements and the order of the Jaccard indices are not the same and that a search speed is reduced when the sizes of the sets A1 510 and B1 520 are large.

In one embodiment, considering that the size of a file is decided by the number of MinHash functions, the MinHash function-based inverse index search method may address the problem with a storage capacity and a speed of the general inverse index search method and may guarantee a high Jaccard index value depending on a similarity. In regard to the MinHash function-based inverse index search method of FIG. 5B, values of A2' 552, B2' 562, and Q2' 572 may be obtained by setting the size of a MinHash function 540 to 3 and applying A2 551, B2 561, and Q2 571. When the similarity between the set Q2' 572 and the set A2' 552 and the similarity between the set Q2' 572 and the set B2' 562 is measured, the following [Equation 3] is derived.

$$Q2' \cap B2' > Q2' \cap A2' \qquad \text{[Equation 3]}$$

This is the same result as J(B2,Q2)>J(A2,Q2).

Although the above has been described with reference to the preferred embodiments of the present disclosure, those skilled in the art can variously modify and change the present disclosure within the scope without departing from the spirit and scope of the present disclosure as set forth in the claims below.

[Detailed Description of Main Elements]

100: hash code-based search system
110: user terminal
130: hash code-based search apparatus
150: hash function population database
210: processor
230: memory
250: user input/output unit
270: network input/output unit

[Detailed Description of Main Elements]

310: token set extracting unit
330: hash code generating unit
350: index generating unit
370: search unit
390: controller
510: set A1
520: set B1
530: set Q1
540: MinHash function
551: set A2
552: set A2'
561: set B2
562: set B2'
571: set Q2
572: set Q2'

What is claimed is:

1. A hash code-based search apparatus comprising:
a token set extracting unit configured to extract a token set having at least one token from a document;
a hash code generating unit configured to generate N hash codes by applying N hash functions to the at least one token, N being a natural number; and
an index generating unit configured to generate a search index by indexing the document with the N hash codes,
wherein the hash code generating unit is further configured to
determine the N hash functions and generate one hash code by applying one of the N hash functions to the at least one token, and
select the N hash functions from a population of hash functions based on a size of a hash code output from each of the hash functions and a type of the document, and
wherein the token set extracting unit, the hash code generating unit, and the index generating unit are each implemented via at least one processor.

2. The hash code-based search apparatus of claim 1, wherein the token set extracting unit is further configured to generate the at least one token by performing an N-gram-based shingling operation on the document.

3. The hash code-based search apparatus of claim 1, wherein the token set extracting unit is further configured to generate the at least one token by performing an N-gram-based shingling operation on the document and add a numeric value after any duplicated token.

4. The hash code-based search apparatus of claim 1, wherein the token set extracting unit is further configured to generate the at least one token by performing an N-gram-based shingling operation on the document and remove any duplicated token.

5. The hash code-based search apparatus of claim 1, wherein the hash code generating unit is further configured to configure each of the N hash functions as a MinHash function so that each of the N hash functions receives the at least one token and a minimum value having a smallest value is determined as the hash code.

6. The hash code-based search apparatus of claim 1, wherein the index generating unit is further configured to configure the N hash codes as an index set of a fixed size, reducing an index storage capacity of the document.

7. The hash code-based search apparatus of claim 1, further comprising:
a document search unit configured to receive a search term and search for the document based on a similarity between the search term and the search index,
wherein the document search unit is implemented via at least one processor.

8. The hash code-based search apparatus of claim 1, wherein the hash code-based search apparatus receives the document as a malware and generates the search index as an index for the malware.

9. The hash code-based search apparatus of claim 1, wherein when the document corresponds to a text file, the hash code generating unit is further configured to select a first hash function from the population of hash functions that outputs a hash code having a first size, and when the document corresponds to a binary file, the hash code generating unit is further configured to select a second hash function from the population of hash functions that outputs a hash code having a second size smaller than the first size.

10. A hash code-based search method comprising:

extracting a token set having at least one token from a document;

generating N hash codes by applying each of N hash functions to the at least one token, N being a natural number;

generating a search index by indexing the document with the N hash codes;

determining the N hash functions and generate one hash code by applying one of the N hash functions to the at least one token; and selecting the N hash functions from a population of hash functions based on a size of a hash code output from each of the hash functions and a type of the document.

11. A non-transitory computer-readable medium having embodied thereon a program, which when executed by a computer causes the computer to execute a hash code-based search method, the method comprising:

extracting a token set having at least one token from a document;

generating N hash codes by applying each of N hash functions to the at least one token, N being a natural number;

generating a search index by indexing the document with the N hash codes;

determining the N hash functions and generate one hash code by applying one of the N hash functions to the at least one token; and selecting the N hash functions from a population of hash functions based on a size of a hash code output from each of the hash functions and a type of the document.

* * * * *